United States Patent
Silva et al.

[19]

[11] Patent Number: 5,975,119

[45] Date of Patent: Nov. 2, 1999

[54] ICE-PROOF FLUID LINE ASSEMBLIES

[75] Inventors: Mark Rudolph Silva, Alta Loma; Verne James Morand, Desert Hot Springs; Thomas Bruce Rose, Downey, all of Calif.

[73] Assignee: Transdigm, Inc., Richmond Heights, Ohio

[21] Appl. No.: 09/128,758

[22] Filed: Aug. 4, 1998

Related U.S. Application Data

[60] Provisional application No. 60/055,469, Aug. 12, 1997.

[51] Int. Cl.[6] .............................. F16K 49/00; E03B 7/12
[52] U.S. Cl. ........................... 137/341; 138/33; 392/480; 392/488
[58] Field of Search ............................. 137/341; 138/33; 392/486–489, 480

[56] References Cited

U.S. PATENT DOCUMENTS 3,120,600  2/1964  True ........................................ 137/341
3,190,502  6/1965  Knibb ...................................... 392/480
4,684,786  8/1987  Mann et al. ............................ 137/341
4,739,657  4/1988  Higashi ................................... 73/204

Primary Examiner—David J. Walczak
Assistant Examiner—Tuan Nguyen
Attorney, Agent, or Firm—Benoit Law Corporation

[57] ABSTRACT

Apparatus for conducting fluid and preventing its icing have a fluid line structure and a tubular fluid line element located in that fluid line structure and having a cross-section sufficient for a desired throughput of fluid. A heater element is located inside the fluid line structure and is in heat-transfer relationship with an inside of the tubular fluid line element. Such heater element may be an electric heater element inside the fluid line structure encompassing the tubular fluid line element in heat-transfer relationship with an inside of that tubular fluid line element. A frangible or other fluid line nipple may be removably connected to the fluid line structure, and the tubular fluid line element may extend from that fluid line structure to that fluid line nipple. A heat transfer reduction may be provided between the electric heater element and the fluid line structure outside of the tubular fluid line element.

20 Claims, 3 Drawing Sheets

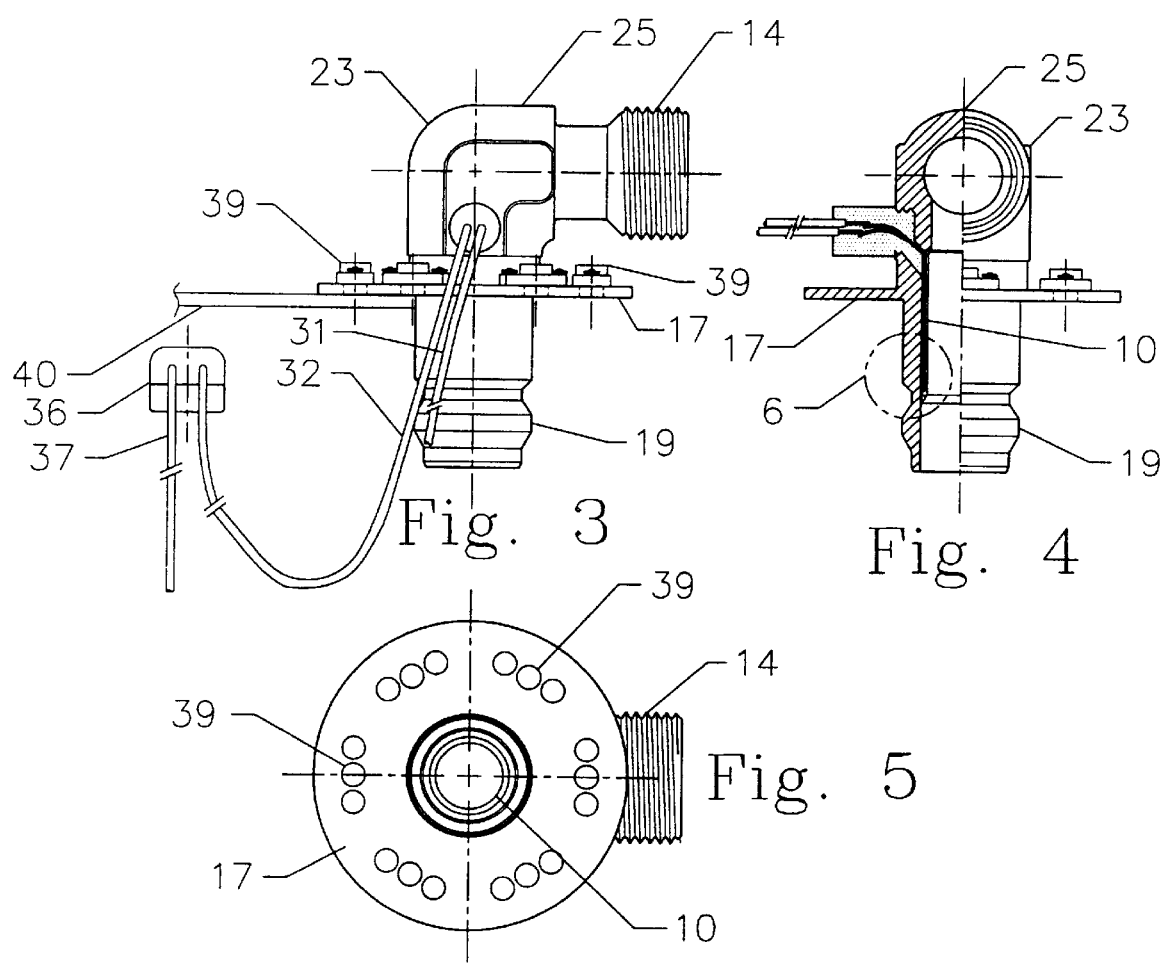

ICE-PROOF FLUID LINE ASSEMBLIES

CROSS-REFERENCE TO PRIORITY APPLICATION

This is a regular Patent Application claiming priority from Provisional Application Ser. No. 60/055,469, filed by and for the subject inventors on Aug. 12, 1997.

FIELD OF THE INVENTION

The subject invention relates to apparatus for conducting fluid and preventing its icing, and, more specifically relates to ice-proof fluid line assemblies.

BACKGROUND

Icing, that is solidification of fluid, is a problem wherever fluid is supposed to flow in a relatively low-temperature environment. By way of example, icing aboard aircraft has continued to be a problem and water lines are particularly vulnerable. In this respect, the expression "water" covers not only potable or pure water, but also water containing additives, sometimes called "blue water," and waste or grey water with entrained liquids and largely emulsified solids. However, the utility of the invention is not limited to the prevention of icing of water, but extends to a prevention of icing, that is low temperature solidification, of other fluids in various fields where preservation of fluid movement or mobility is important.

As one of many examples, it is important that no ice plug form in water or other fluid line assemblies. For one thing, such line assemblies have to be ready for water or other fluid flow or servicing at all times. Moreover, the formation of ice plugs in such assemblies regularly prompts service personnel to stab into such lines with ice picks and other implements which can damage the assembly.

By way of remedial action, electrically heated jackets have been provided over part of the outside of the assembly. Typically, such electric heating devices had to be formed or molded to the water line, elbow or other fitting to be heated. Such type of heating required large amounts of power dissipation in order to generate enough heat to prevent internal ice formations. For one thing, such conventional heaters were beset by practically inevitable heat transfer problems between the inside of the heater and the adjacent outside of the water line or fitting, which required a corresponding increase of the electric energy energizing the heating element, and which in turn correspondingly loaded the onboard power supply and shortened the useful life of the heating element. The problem was aggravated by the presence of O-rings in the water line fitting assembly which naturally impeded heat flow to the water in the assembly. In consequence, conventional heater approaches often elevated the surface temperature of water line components beyond safe levels and safety guidelines.

Similar approaches using coiled tubular heating elements tended to suffer from dielectric breakdown.

Problems also exist in other areas, such as in cryogenics, where moving fluids have to be maintained in a certain state, and where O-rings and other seals have to be maintained at certain temperatures.

SUMMARY OF THE INVENTION

The invention resides in apparatus for conducting fluid and preventing its icing at a service panel, comprising, in combination, a tubular fluid line structure having a first end and an oopposite second end, a fluid line nipple at the first end of the tubular fluid line structure, a tubular fluid line element in that tubular fluid line structure having a cross-section sufficient for a desired throughput of fluid and extending substantially to the fluid line nipple so as to prevent icing of the fluid at that fluid line nipple, a heater element inside the fluid line structure and in heat-transfer relationship with an inside of the tubular fluid line element and a mounting flange encompassing the tubular fluid line structure between the first and second ends for mounting the tubular fluid line structure on the service panel.

From a related aspect thereof, the invention resides in apparatus for conducting fluid and preventing its icing at a service panel, comprising, in combination, a tubular fluid line structure having a first end and an opposite second end, a fluid line nipple at the first end of the tubular fluid line structure, a tubular fluid line element in that tubular fluid line structure having a cross-section sufficient for a desired throughput of fluid and extending substantially to the fluid line nipple so as to prevent icing of the fluid at that fluid line nipple, an electric heater element inside the tubular fluid line structure encompassing the tubular fluid line element a mounting flange encompassing the tubular fluid line structure between the first and second ends for mounting the tubular fluid line structure on the service panel, and a stopper device for selectively closing and alternatively opening the nipple in heat-transfer relationship with an inside of that tubular fluid line element.

From another related aspect thereof, the invention resides in apparatus for conducting fluid and preventing its icing at service panel, comprising, in combination, a tubular fluid line structure, a fluid line nipple removably connected to the first end of that tubular fluid line structure, a tubular fluid line element extending from the fluid line structure to that fluid line nipple and having a cross-section sufficient for a desired throughput of fluid, an electric heater element inside the tubular fluid line structure encompassing the tubular fluid line element in heat-transfer relationship with an inside of that tubular fluid line element, a heat transfer reduction between the electric heater element and the fluid line structure outside of the tubular fluid line element a removable mounting flange encompassing the tubular fluid line structure between the first and second ends for mounting that tubular fluid line structure on the service panel, and a removable locking assembly on the fluid line nipple.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which:

FIG. 3 is a side view of an angled fluid line assembly with associated circuitry according to a further embodiment of the invention;

FIG. 4 is a partially sectioned end view from the right-hand side of FIG. 3;

FIG. 5 is a bottom view of FIG. 3;

DESCRIPTION OF THE PREFERRED EMBODIMENTS

The heart of the assemblies shown in FIGS. 1 to 6 of the drawings is a hollow-cylindrical integral fluid-line-and-electric-heater tubular element 10. In method terms, the invention provides a hollow-cylindrical integral fluid-line-and-electric-heater tubular element 10 for the flow of water or other fluid therethrough. That tubular element has an inside diameter 12 sufficient for a desired throughput of fluid.

Figures 1, 2:
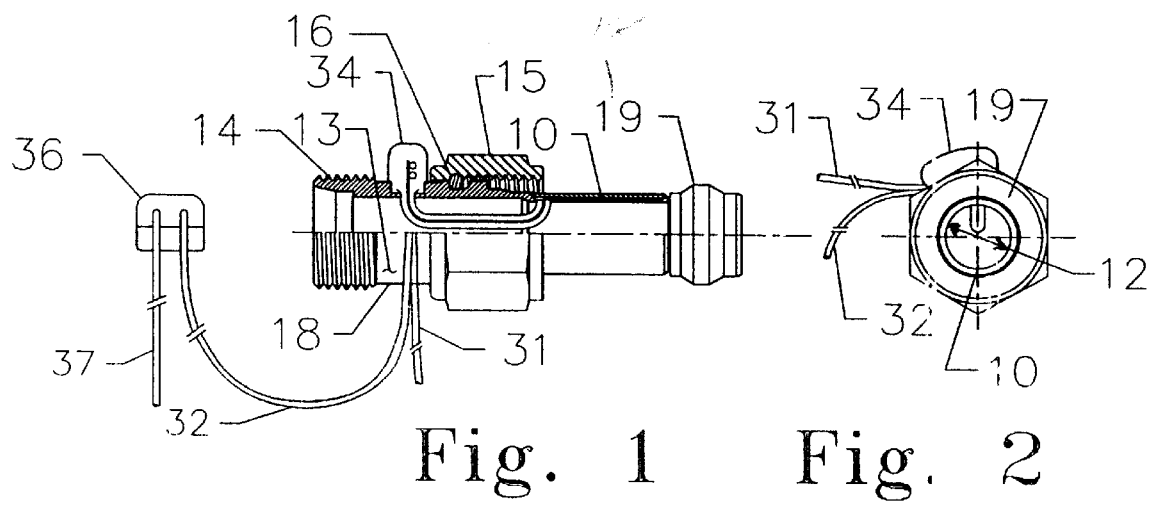
FIG. 1 is a partially sectioned side view of a fluid line assembly with associated parts according to an embodiment of the invention.
FIG. 2 is an end view from the right-hand side of part of FIG. 1 without its removable nipple and flange component.

In FIG. 1, the tubular heater element 10 is integral or in one piece with fluid line structure 18 that may have an externally threaded end 13 that, by way of example and not by way of limitation, may be of a customary size, such as the familiar MS33514-size thread 14.

The fluid line structure 18 may include or carry an internally threaded hexagonal or other nut 15 being rotatable thereabout, but being retained against substantial axial movement by a retainer ring 16. Such nut 15 may be used to mount the assembly shown in FIG. 1 on a flanged structure such as shown in FIGS. 3 to 5 or 7 at 17 or 117 for connection to a service panel 40, whereby parts of the assembly may be integral with each other.

FIGS. 3 to 5 show a one-piece assembly. The fluid line assemblies according to the embodiments of FIGS. 3 to 5 and 7 are angled, rather than being straight as in the embodiment of FIGS. 1 and 2. However, it would be possible within the scope of the invention to make all embodiments straight and/or to make these embodiments either in a one-piece structure or just integral in an assembly.

Figure 7:
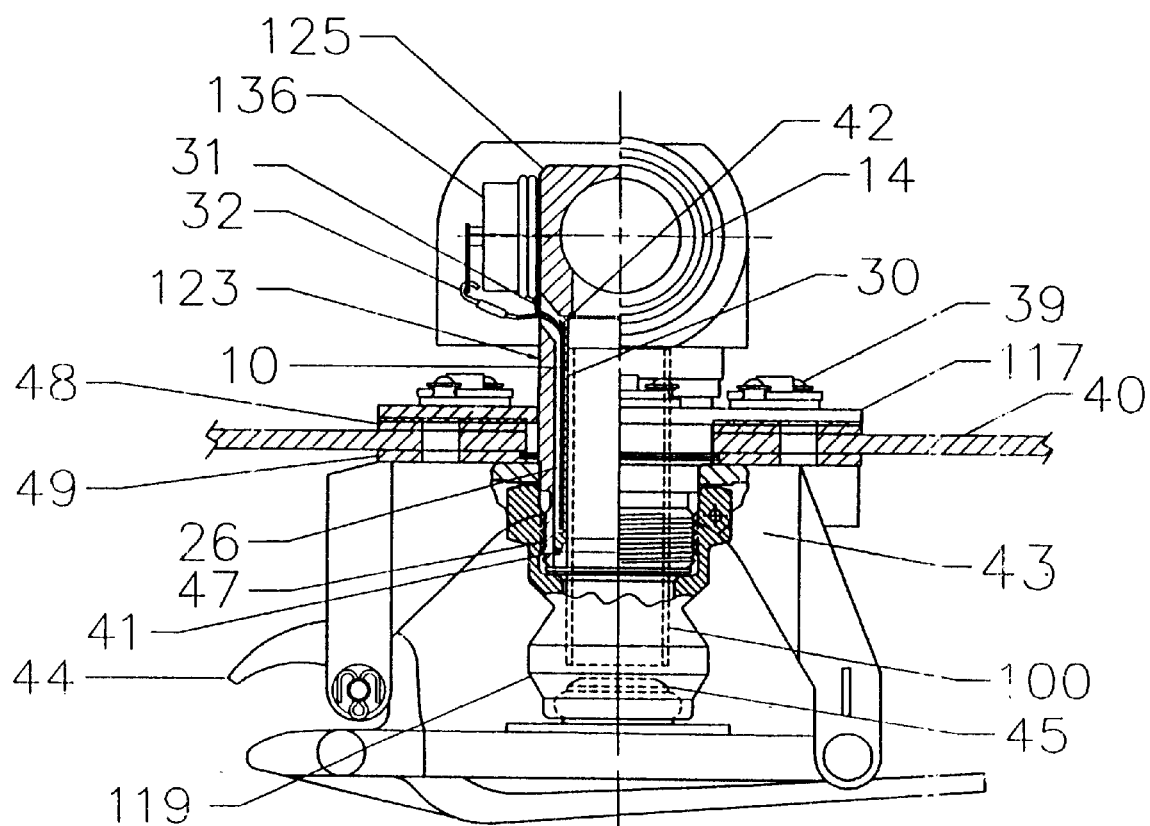
FIG. 7 is a side view, partially in section, of a fluid line assembly according to a further embodiment of the invention.

The assembly 23 or 123 includes an elbow 25 or 125, such as seen in FIG. 3 from a first side and in FIG. 7 from a second side rotated by ninety degrees from that first side. Within the scope of the invention, however, a T-type or other multiple fitting may be provided instead, such as for the purpose of feeding water or other fluid to or from a tank, galley and/or lavatory.

By way of example, different ends may be provided, such as a fill and drain nipple end as shown by way of example at 19 and 119, and various other nipples in combination. However, different ends, such as beaded ends, ferrules or other interface connections, may in practice be substituted for the threaded and other ends shown in the drawings.

Within the scope of the invention, the heater element 10 may be in physical and heat-transfer contact with the fluid line structure 18 and nipple 19. However, according to a preferred embodiment of the invention, heat transfer between the internal tubular heater element 10 and the external fluid line structure 18 and nipple structure 19 is deliberately reduced relative to the type of heat transfer resulting from a direct contact between and along the heater element and the external fluid line and nipple structure. The tubular heater element 10 may be dimensioned to easily slide into the tube or fluid line structure 18 and 19, but preferably does not contact such external parts 18 and 19 or fluid line structure of the assembly. According to this embodiment of the invention, the tubular heater element 10 is not in heat-transfer relationship with the flanged portion of the assembly including parts 17 to 19. Accordingly, the heat energy provided by the tubular heater element 10 is concentrated on the fluid contained and flowing therein or thereat, and is not objectionably dissipated externally to the flange structure nor to any service panel 40 on which it is mounted.

Figure 6:
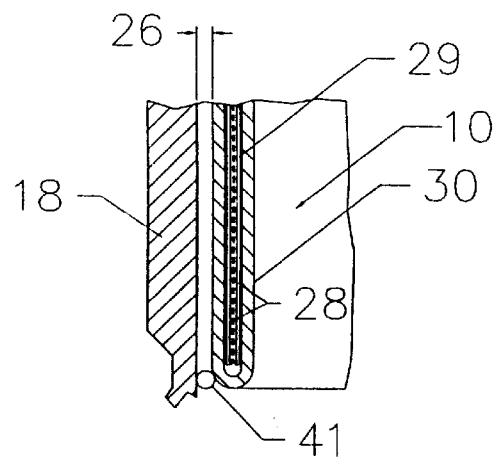
FIG. 6 is an enlarged view that may be taken within the phantom circle 6 in FIG. 4.

As shown by way of example in FIG. 6 relative to FIG. 4 and also in FIG. 7, the heater element 10 is spaced from the assembly wall structure, such as from the wall of fluid line structure 18, 23 or 123. FIGS. 6 and 7 show a spacing 26 in this respect. The same spacing may be provided in the embodiments of FIGS. 1 to 5.

Such spacing 26 may be filled with an insulating material. As indicated in FIGS. 6 and 7, the outward end of the heater assembly 30 may be sealed, such as by a circular weld, seal 41 or other termination. A similar seal 42 may be provided at the other end of the heater element, such as shown in FIG. 7, whereby the space 26 may remain filled with air or may be filled with another gas or gas mixture, or may be evacuated, for optimum control or inhibition of heat dissipation for any given purpose. The heating element 10 thus becomes an encapsulated immersion heater.

The tubular element 10 preferably is an embedded heater fitting that does not require an external heater source to ensure ice prevention. The heater and fitting preferably are combined in one assembly 10, maximizing heat transfer efficiency while minimizing required power and enhancing overall safety.

The assembly constituting the tubular element 10 preferably is hermetically sealed to prevent corrosive damage to the internal heater element 28. By way of example, the tubular element 10 comprises an embedded etched foil heater element of metal or other electrically resistant material.

An etched metal foil heater 28, made of suitable material, such as Inconel 600, laminated between layers of Kapton or other heat-resistant electrically insulating sheet material or tape 29 is presently preferred in order to provide a very low profile heater subassembly. The heater shown at 28 may be a boustrophedonic resistance heater. By way of example, such heater may be deposited on its substrate 29 in a boustrophedonic or square-wave pattern, and such heater and substrate may be preformed to the diameter of the fitting or cladding 30 and bonded to the internal surface of such cladding, preferably with the aid of double-sided tape to ensure direct contact to the cladding 30, thereby optimizing better heat transfer to the fluid to be deiced or to be kept ice-free at optimum heater efficiency.

In this respect, required heater power may be less than one watt per square centimeter in the practice of the subject invention.

Electrical lead wires 31 and 32 may provide power and ground return to the internal heater 28 when connected to an onboard power supply. Such leadwires preferably are soldered or fusion welded to the internal heater element 28, and the mating junctions may be encapsulated or overmolded in an epoxy resin or other non-conductive, high dielectric-strength material 34 at the leadwire ingress an egress location on the assembly.

A thermostat, thermal switch or other temperature sensing device 36 or another control may be inserted in the leadwire 32, such as with the aid of a power supply lead wire 37, in order to regulate energization of the heater element 28 according to needed ice prevention or deicing performance. A preferred embodiment of the invention mounts the thermostat directly on and in heat-transfer relationship with the fluid conducting and icing prevention assembly, such as shown at 136 in FIG. 7.

Nipple 19 or 119 may be selectively closed and alternatively opened for a supply of fluid or for draining. A stopper device may be used for that purpose. By way of example, the embodiment of FIG. 7 includes a lever lock assembly 43 with an overcenter latch 44 for selectively placing a stopper device 45 onto the opening of nipple 119. Like or similar stoppers or lock assemblies may be employed in the embodiments of FIGS. 1 to 5. These are conventional devices and, therefore, are not shown in all of the illustrated embodiments.

Conventional fasteners 39 may be employed to mount such lever lock assembly on the flange 17 or 117 and/or to mount such flange on a service panel partially shown at 40.

By way of general comment, it may be recognized that the drawings illustrate apparatus for conducting fluid and preventing its icing. According to preferred embodiments of the invention, such apparatus comprise, in combination, a fluid line structure 18, 23 or 123, a tubular fluid line element in that fluid line structure having a cross-section sufficient for a desired throughput of fluid, and a heater element inside that fluid line structure and in heat-transfer relationship with an inside of the tubular fluid line element.

The drawings show variations of this concept within the scope of the invention. In this respect, the heater element may be integral with the tubular fluid line element inside the fluid line structure 18, 23 or 123, such as seen at 10 in FIGS. 1 to 6 or 100 in FIG. 7. In this respect, the heater element may be in one piece with the tubular fluid line element, such as shown at 10 and described above with respect to FIGS. 1 to 6. The embodiment of FIG. 7 also may have the heater element 10 shown in FIG. 6, but has a tubular fluid line element 100 associated therewith, as more fully described below.

In either case, the heater element is tubular. In the case of FIGS. 1 to 6, the heater element is the tubular fluid line element, such as shown at 10 and described above. The heater element encompasses the tubular fluid line element, such as also seen at 10 in FIG. 6 and at 100 in FIG. 7.

Preferred embodiments of the invention provide a heat transfer reduction between the heater element and the fluid line structure outside of the tubular fluid line element, such as by spacing the heater element 10 from an inside of the fluid line structure 18, 23 or 123, or as otherwise described above in the context of FIG. 6. As seen in FIG. 7, both the heater element 10 and the tubular fluid line element 100 are spaced from an inside of the fluid line structure 123 for improved heat transfer reduction or thermal insulation of these elements from the external fluid line structure 18, 23 or 123, flanging 117 and lock assembly 43.

Moreover, while FIGS. 1 and 3 to 5 show a mounting flange 17 that may be in one piece with the fluid line structure, the mounting flange preferably is removable from the fluid line structure, such as in the embodiment of FIG. 7. That embodiment also has a fluid line nipple 119 connected to the fluid line structure. By way of example the fluid line structure 123 may have an external thread 47 at an end thereof, on which the removable fluid line nipple 119 may be threaded. Heat transfer impeding elements, such as heat insulating washers 48 and 49 and sealing O-rings (not shown) may be provided between flange 117, service panel 40, lever lock assembly 43, and at or in the nipple structure 119.

All this effects a heat transfer reduction between the mounting flange 117 and the fluid line structure 123, thereby further conserving the heat energy provided by heater 10, which preferably is spaced or otherwise thermally insulated from the inside of the fluid line structure 123.

On the other hand, the tubular fluid line element 100 extends from the fluid line structure 123 to the fluid line nipple 119, preferably in heat-transfer relationship with heater 10. The electric heater element 10 inside fluid line structure 123 preferably encompasses the tubular fluid line element 100 in heat-transfer relationship with an inside of that tubular fluid line element, for the prevention of icing of fluid in nipple 119 and structure 123 at minimal energy consumption.

The above mentioned desired heat transfer reduction between heater element 10 and fluid line structure 123 preferably is outside of the tubular fluid line element 100, such as described above.

The combination of such heat insulating measures and the achievement of low heater wattage for the desired icing prevention according to preferred embodiments of the invention also keep excessive heat away from the service panel 40. In practice, this is important, especially in the case of aircraft where weight considerations dictate the use of aluminum and alloys that are prone to fatigue when subjected to vibration at elevated temperatures.

The removable nipple 119 preferably is a frangible nipple that may be torn away, if service personnel inadvertently leaves a hose connected to such nipple when their service vehicle moves away from the service panel 40, or when an aircraft or other vehicle of which that service panel is a part starts moving away from the service vehicle or other service station.

At least part of the fluid line structure 18, 23 or 123 may be provided with external heat insulation, such as with a jacket or overmold 50 of silicone rubber or other suitable thermal insulating material.

This extensive disclosure will render apparent or suggest to those skilled in the art various modifications and variations within the spirit and scope of the invention.

We claim:

1. Apparatus for conducting fluid and preventing its icing at a service panel, comprising in combination:

a tubular fluid line structure having a first end and an opposite second end;

a fluid line nipple at said first end of said tubular fluid line structure;

a tubular fluid line element in said tubular fluid line structure having a cross-section sufficient for a desired throughput of fluid and extending substantially to said fluid line nipple so as to prevent icing of said fluid at said fluid line nipple;

a heater element inside said tubular fluid line structure and being in heat-transfer relationship with an inside of said tubular fluid line element; and a mounting flange encompassing said tubular fluid line structure between said first and second ends for mounting said tubular fluid line structures on aid service panel.

2. Apparatus as in claim 1, wherein:

said heater element is integral with said tubular fluid line element inside said fluid line structure.

3. Apparatus as in claim 1, wherein:

said heater element is in one piece with said tubular fluid line element inside said fluid line structure.

4. Apparatus as in claim 1, wherein:

said heater element is tubular.

5. Apparatus as in claim 1, wherein:

said heater element is said tubular fluid line element.

6. Apparatus as in claim 1, wherein:

said heater element encompasses said tubular fluid line element.

7. Apparatus as in claim 1, including:
a heat transfer reduction between said heater element and said fluid line structure outside of said tubular fluid line element.

8. Apparatus as in claim 1, wherein:
said heater element is spaced from an inside of said fluid line structure.

9. Apparatus as in claim 1, wherein:
said heater element and tubular fluid line element are spaced from an inside of said fluid line structure.

10. Apparatus as in claim 1, wherein:
said fluid line nipple is a frangible fluid line nipple removably connected said fluid line structure.

11. Apparatus as in claim 1, wherein:
said mounting flange is removable from said fluid line structure.

12. Apparatus as in claim 1, including:
a heat transfer reduction between said mounting flange and said fluid line structure.

13. Apparatus for conducting fluid and preventing its icing at a service panel, comprising in combination:
a tubular fluid line structure having a first end and an opposite second end;
a fluid line nipple at said first and of said tubular fluid line structure;
a tubular fluid line element in said tubular fluid line structure having a cross-section sufficient for a desired throughput of fluid and extending subtantially to said fluid line nipple so as to prevent icing of said fluid at said fluid line nipple;
an electric heater element inside said tubular fluid line structure encompassing said tubular fluid line element and being in heat-transfer relationship with an inside of said tubular fluid line element;
a mounting flange encompassing said tubular fluid line structure between said first and second ends for mounting said tubular fluid line structure an said service panel; and
a stopper device for selectively closing and alternatively opening said nipple.

14. Apparatus as in claim 13, including:
a heat transfer reduction between said heater element and said fluid line structure outside of said tubular fluid line element.

15. Apparatus as in claim 13, wherein:
said heater element is spaced from an inside of said fluid line structure.

16. Apparatus as in claim 13, wherein:
said heater element and tubular fluid line element are spaced from an inside of said fluid line structure.

17. Apparatus as in claim 13, wherein:
said electric heater element comprises a boustrophedonic resistance heater.

18. Apparatus for conducting fluid and preventing its icing at a service panel, comprising in combination:
a tubular fluid line structure having a first end and an opposite second end;
a fluid line nipple removably connected to said first end of said tubular fluid line structure;
a tubular fluid line element extending from said fluid line structure to said fluid line nipple and having a cross-section sufficient for a desired throughput of fluid;
an electric heater element inside said tubular fluid line structure encompassing said tubular fluid line element being in heat-transfer relationship with an inside of said tubular fluid line element;
a heat transfer reduction between said electric heater element and said tubular fluid line structure outside of said tubular fluid line elements;
a removable mounting flange encompassing said tubular fluid line structure between said first and second ends for mounting said tubular fluid line structure on said service panel; and
a removable locking assembly on said fluid line nipple.

19. Apparatus as in claim 18, including:
a heat transfer reduction between said heater element and said tubular fluid line structure outside of said tubular fluid line element whereby beat energy is not objectionably disoipated externally to said removable mounting flange.

20. Apparatus as in claim 18, wherein:
said fluid line nipple is a frangible nipple at said service panel.

* * * * *